United States Patent [19]

Thoma

[11] 3,802,268
[45] Apr. 9, 1974

[54] CAPACITANCE HUMIDITY SENSING ELEMENT
[75] Inventor: Paul E. Thoma, Burlington, Wis.
[73] Assignee: Johnson Service Company, Milwaukee, Wis.
[22] Filed: May 6, 1971
[21] Appl. No.: 140,789

[52] U.S. Cl. .............................. 73/336.5, 317/246
[51] Int. Cl. ....................... G01n 25/64, H01g 7/00
[58] Field of Search .............. 73/336.5, 335, 73, 29; 317/246; 324/61 R, 61 P

[56] References Cited
UNITED STATES PATENTS
| | | | |
|---|---|---|---|
| 3,582,728 | 6/1971 | Thoma | 317/246 |
| 3,350,941 | 11/1967 | Misevich | 317/246 |
| 3,315,518 | 4/1967 | Charlson | 73/336.5 |

Primary Examiner—Richard C. Queisser
Assistant Examiner—Denis E. Corr
Attorney, Agent, or Firm—Andrus, Sceales, Starke & Sawall

[57] ABSTRACT

A synthetic capacitance humidity sensing element comprising a moisture sensitive dielectric core and having electrode layers integrally bonded to opposite surfaces of the core. Each electrode layer consists of a matrix of a dielectric, moisture-permeable material, and a plurality of interconnected electrically conductive particles are dispersed within the matrix. At least one of the electrode layers has a length and width less than the corresponding dimensions of the core so that the ends and side edges of the core project beyond these of the electrode layer. A projecting mound or daub of electrically conductive material is applied to each electrode layer. In the preferred form, the humidity sensing element is bent in a generally U-shaped configuration and the ends of the element are connected to an insulating frame in a manner such that the projecting tabs of the electrically conductive material are compressed against electrical contacts on the frame which in turn are connected to terminals. Changes in relative humidity in the atmosphere provide a change in the capacitance of the element and this can be converted into a signal to indicate the relative humidity or to operate a humidity control system.

27 Claims, 13 Drawing Figures

PATENTED APR 9 1974

INVENTOR
PAUL E. THOMA

BY Andrus, Sceales, Starke & Sawall

ATTORNEYS

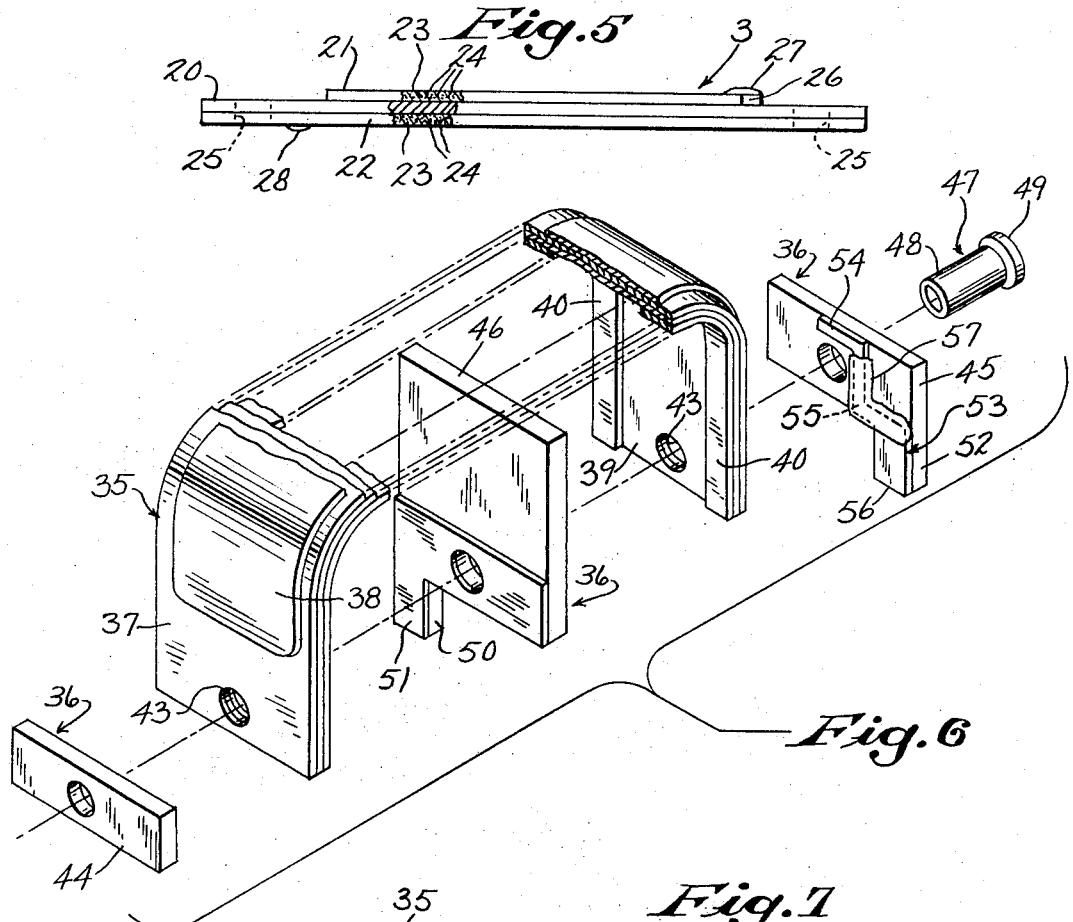

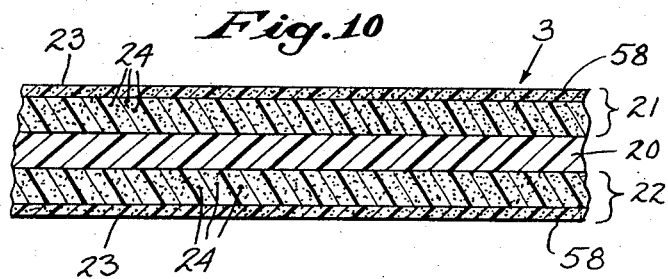
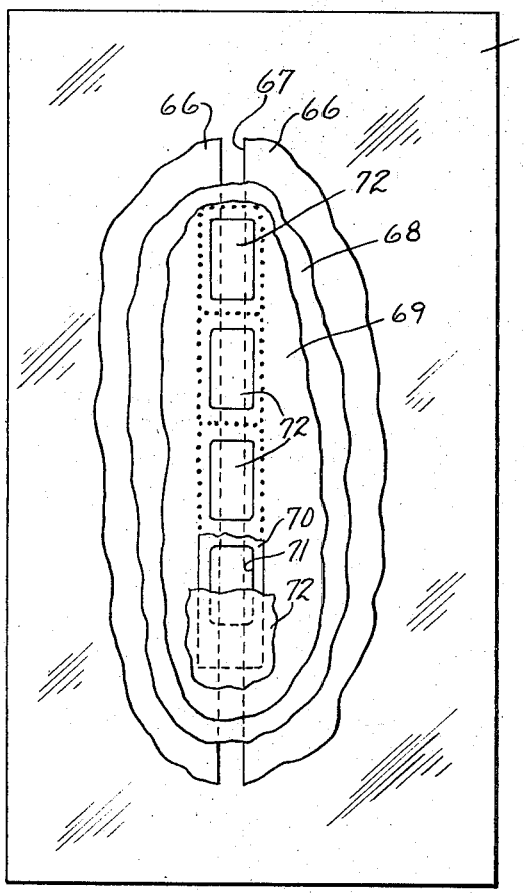
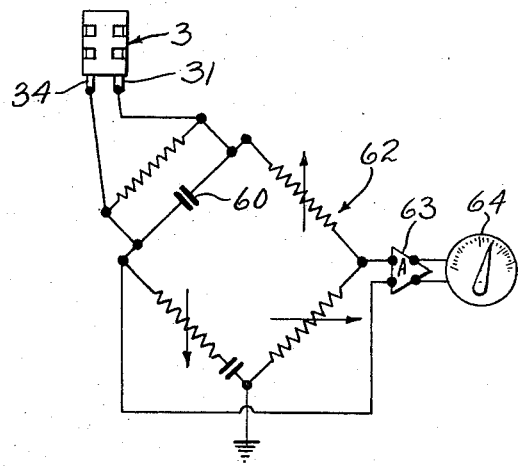
INVENTOR
PAUL E. THOMA

CAPACITANCE HUMIDITY SENSING ELEMENT

BACKGROUND OF THE INVENTION

This invention relates to an improved capacitance humidity sensing element for use in a humidity control and/or humidity indication system.

Humidity sensing elements of the electrical capacitance type are sensitive to changes in the moisture content of the air and respond in the form of a change in capacitance to variations in humidity. U.S. Pat. No. 3,350,941 discloses a capacitance humidity sensing element including a moisture insensitive, non-metallic core, and thin layers or coatings of a moisture sensitive dielectric material are bonded to opposte surfaces of the core and are capable of adsorbing water and reaching an equilibrium in a short period of time. According to the above patent, a porous layer of an electrically conductive material, such as carbon, is applied to the outer surfaces of the moisture sensitive layers. The primary shortcomings of this type of capacitance humidity sensing element are manufacturing difficulties and the instability of the porous layer of the electrically conductive material.

U.S. Pat. application Ser. No. 804,792, filed Mar. 6, 1969, now U.S. Pat. No. 3,582,728, is directed to an improved type of capacitance humidity sensing element which consists of a moisture sensitive dielectric core and electrode layers which are integrally bonded to opposite surfaces of the core. In accordance with the aforementioned patent application, each electrode layer consists of a matrix of a dielectric moisture permeable material, and a plurality of interconnected, electrically conductive particles are dispersed within the matrix. The element of the aforementioned patent application is supported within a central opening of an annular frame, which includes an electrically conductive ring that is electrically connected with the electrode layers of the element by silver paint contacts. While the humidity sensing element of the aforementioned patent application overcomes the problems encountered with that described in U.S. Pat. No. 3,350,941, problems have been encountered in cracking of the silver paint contacts which connect the electrode layers to the conducting ring on the frame, and splitting of the capacitance-type film when the element is subjected to very low humidity.

SUMMARY OF THE INVENTION

The present invention is directed to an improved capacitance humidity sensing element which overcomes the problems associated with the prior art elements. According to the invention, the element comprises a moisture sensitive dielectric core, and electrode layers are integrally bonded to opposite surfaces of the core. Each electrode layer consists of a matrix of a dielectric, moisture-permeable material, and a plurality of interconnected, electrically conductive particles, such as carbon, are dispersed within the electrode layers.

At least one of the electrode layers has a length and width less than the corresponding dimensions of the core, so that the ends and side edges of the core project beyond the electrode layer. The element is preferably utilized in a U-shaped configuration in which the ends of the element are connected to an insulating frame. Small mounds of an electrically conductive material, such as silver paint, are applied to both of the electrode layers and when the element is assembled in the frame, the mounds of the electrically conductive material are compressed against electrical contacts on the frame which in turn are connected to terminals.

With the humidity sensing element of the invention, changes in relative humidity provide changes in capacitance of the element and this can be converted to a signal to indicate the relative humidity directly or to operate a humidity control system.

To increase the rate of response of the element to changes in relative humidity, the outer surface of the matrix of the electrode layers can be hydrolyzed.

In a modified form of the invention, a dielectric strip can be applied to each side edge of the electrode layer which extends the full width of the core, and the edge strips, which preferably have the same composition and thickness as the dielectric core layer, prevent edge curling of the element, particularly when the element is subjected to a hydrolyzing treatment.

The humidity sensing element of the invention is relatively simple to manufacture and assemble. Moreover, assembling the element with the frame automatically connects the electrode layers to the terminals of the frame and this substantially reduces the labor required in assembling the element as compared to conventional capacitance type elements.

As a further advantage, the element of the invention is relatively free of mounting and configuration problems which have been encountered with other types of capacitance humidity sensing elements in the past, and the element of the invention can be manufactured under conditions having less environmental control.

The element is an approximately pure capacitance element which significantly reduces the dissipative effect present in certain prior art types of capacitance humidity sensing elements. The element will give a fast and precise indication of humidity in the range of 5 to 95 percent relative humidity and will not be damaged hy humidity extremes.

Other objects and advantages will appear in the course of the following description.

The drawings illustrate the best mode presently contemplated of carrying out the invention. In the drawings:

FIG. 5 is a side elevation of the element shown in FIG. 4;

FIG. 6 is an exploded view of a modified form of the invention including the element and the mounting frame;

FIG. 7 is a plan view of the humidity sensing element as utilized in the mounting arrangement of FIG. 6;

FIG. 8 is a side elevation of the element shown in FIG. 7;

FIG. 9 is an end view of the element shown in FIG. 7;

FIG. 10 is an enlarged sectional view of a modified form of the humidity sensing element in which the outer electrode layers are hydrolyzed;

FIG. 11 is a further modified form of the humidity sensing element;

FIG. 12 is an electrical circuit showing a typical manner in which the element can be connected in a humidity indication system; and FIG. 13 is a schematic view showing the method of fabricating the humidity sensing element.

Figure 1:
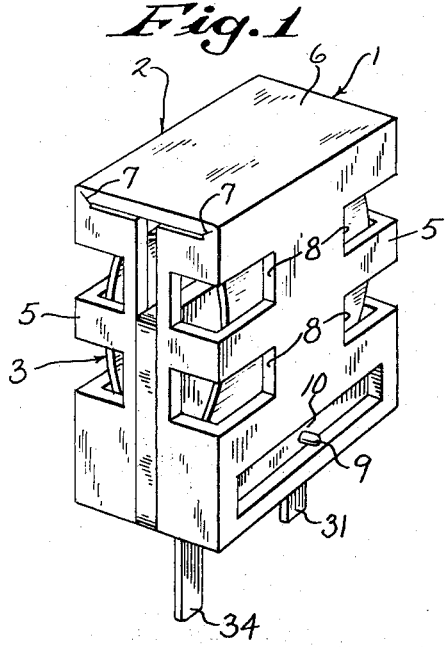
FIG. 1 is a perspective view of the humidity sensing assembly of the invention.

FIG. 1 illustrates a capacitance humidity sensing assembly 1, including an outer insulating casing 2, and a humidity sensing element 3 is secured to a frame 4 and mounted within the casing 2. The casing 2 includes a pair of side members 5 which are connected together by a top wall 6. The casing is preferably formed of an electrically insulating, plastic material, such as linear polyethylene, and the joints between the top wall 6 and the side members 5 are provided with a lesser thickness to provide integral hinges 7 so that the side members 5 can be pivoted with respect to the top wall 6.

To provide exposure for the element 3 to the atmosphere, the side members 5 of the casing 2 are provided with a series of openings 8.

To mount the frame 4 and humidity sensing element 3 within the casing 2, the lower end of one of the side members 5 is provided with a pin 9 which is adapted to extend through aligned openings in the element 3 and frame 4, as well as through a hole 10 in the opposite side member. In assembled condition, the projecting end of the pin 9 can be heat sealed to provide a sealed assembly.

Figure 2:
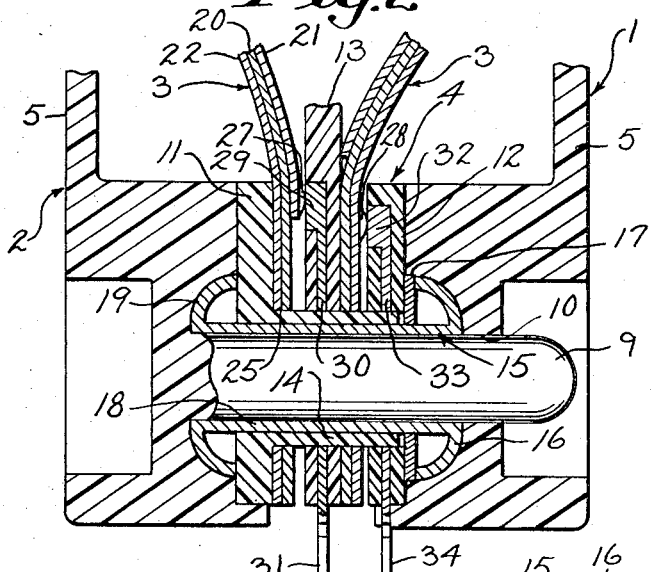
FIG. 2 is a transverse section showing the mounting of the humidity sensing element in the frame and outer casing.
Figure 3:
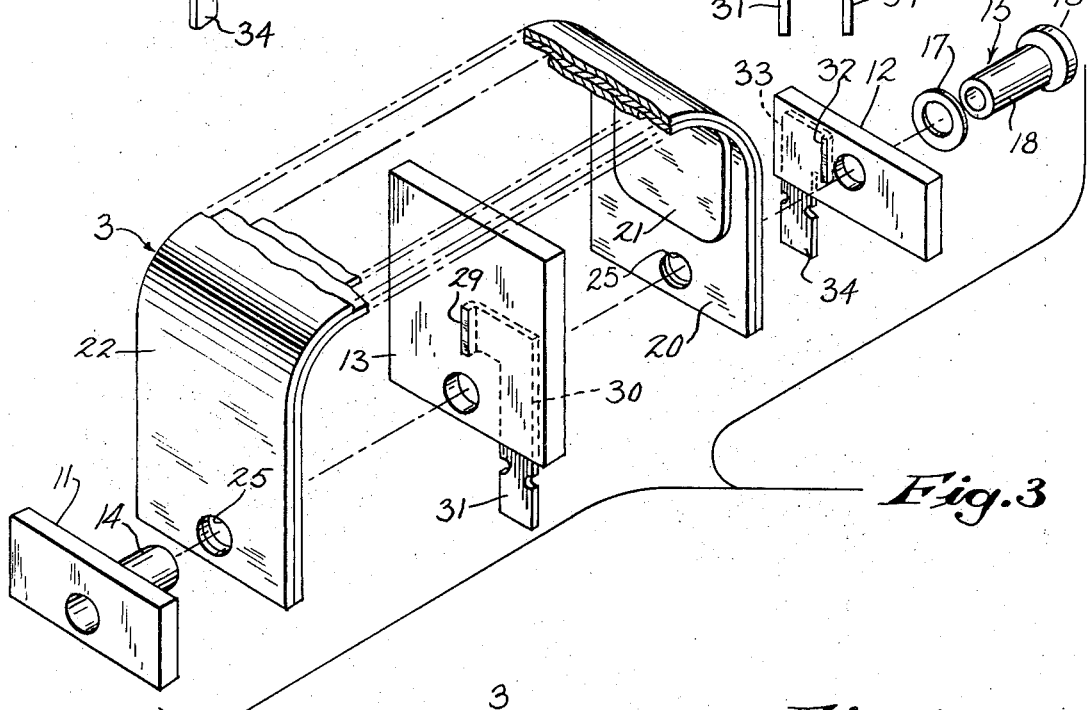
FIG. 3 is an exploded view of the element and the mounting frame.

As best illustrated in FIGS. 2 and 3, the frame 4 is composed of a pair of end plates 11 and 12 and a central plate 13 which has a substantially greater height than the end plates 11 and 12. The humidity sensing element 3 is bent to a generally U-shaped configuration and the ends of the element lie in spaced generally parallel planes and are adapted to be secured between the central plate 13 and the respective end plates 11 and 12.

To connect the plates of the frame 4 together, the end plate 11 is provided with a tubular projection 14 which extends through aligned openings in the ends of the element 3, the central plate 13 and partially through the opposite end plate 12.

An eyelet or rivet 15 extends through the interior of the tubular member 14 and serves to clamp the end plates 11 and 12 together. Eyelet 15 is provided with an enlarged head 16 which bears against a spring washer 17 located on the outer surface of the plate 12. The hollow shank 18 of eyelet 15 extends through the interior of the tube 14. The opposite end of the eyelet is then formed into an enlarged head 19 that bears against the outer surface of the end plate 11. As the plates 11, 12, and 13, as well as the tube 14, are formed of an insulating material, the eyelet 15 or rivet can be formed of a metallic material, for the eyelet is completely insulated from the element 3.

The element 3 comprises a sheet-like core 20 of dielectric material which is sensitive to moisture conditions, and electrode layers 21 and 22 are integrally bonded to opposite surfaces of the core 20. Each electrode layer 21 and 22 includes a matrix of a dielectric, moisture permeable material 23 and a plurality of interconnected electrically conductive particles 24 are dispered within the matrix. Both the core 20 and electrode layers 21 and 22 are capable of absorbing at least 1 percent, based on their dry weight, of moisture when exposed to 95 percent relative humidity at 70°F in a period of one-half hour, the dry weight to be measured at less than 5 percent relative humidity at 70°F.

The core 20 and matrix 23 of th electrode layers should both have a dielectric constant less than 10 and generally in the range of 1.1 to 8 at realtive humidities of 5 percent and less, and the core and matrix, at a relative humidity of 80 percent, should have a dielectric constant at least 1.25 times the dielectric constant of the dry material. The core 20 and the matrix 23 of the electrode layers should also have a high electrical resistivity above $1 \times 10^9$ ohm inches.

In most cases the matrix 23 of electrode layers 21 and 22 will be formed of materials which have the same moisture sensitivity as the material of core 20, but in some instances the matrix 23 may be more moisture sensitive than the core or may be less moisture sensitive than the core. More specifically, the core 20 and the matrix 23 of electrode layers 21 and 22 can be composed of materials such as cellulose esters in which the esterifying acids contain up to 20 carbon atoms, and preferably up to six carbon atoms, such as cellulose acetate, cellulose acetate-butyrate, cellulose acetate-propionate, cellulose acetate-valerate, and cellulose succinate; cellulose, ethyl cellulose; methyl cellulose; gelatin; polyvinyl alchol; polyacrylamide; polyacrylic acid; keratin; collagen; starch and starch derivatives; regenerated protein such as casein and zein; and synthetic polymers such as polyvinyl pyrrolidone and nylon.

In addition, the core 20 and matrix 23 of electrode layers 21 and 22 can be formed of crosslinked materials such as those disclosed in U.S. Pat. No. 3,461,723. More specifically, the crosslinked material is formed by the reaction of a compound containing glucoside chains, such as a cellulosic material, and a monomer or partial polymer capable of reacting with the hydroxyl groups of the glucosides. The glucoside-containing compound can be cellulose or a cellulose ester in which the esterifying acids contain up to 20 carbon atoms and preferably up to six carbon atoms. Specific examples are cellulose nitrate, cellulose triacetate, cellulose butyrate, cellulose propionate, cellulose succinate, cellulose phthalate, or the like. Mixed cellulose esters such as cellulose acetate-butyrate, cellulose acetate-propionate, cellulose ethers in which the etherifying alchol contains up to eight carbon atoms, such as ethyl cellulose, methyl cellulose, hydroxypropylmethyl cellulose, and hydroxybutylmethyl cellulose can also be employed. The stabilizing monomer or partial polymer can take the form of urea-formaldehyde, phenolformaldehyde, melamine-formaldehyde, triazine-formaldehyde, hexamethoxymethylmelamine, glyoxal, 2-hydroxyadipaldehyde, and the like.

The electrically conductive particles 24 can be formed of an electrically conductive material, such as carbon, zinc, aluminim, or the like, but preferalby the particles are formed of graphitized or amorphous carbon, such as disclosed in copending U.S. application Ser. No. 66,319 filed Aug. 24, 1970.

The carbon particles are hydrophobic, meaning that they will adsorb and/or absorb less than 4 percent by weight of water at 78°F with relative humidity changes from 0 to 90 percent, and preferably will adsorb less than 1 percent water under these conditions. The carbon can be present in an amount up to 75 percent, and generally in the range of 25 to 60 percent, by weight of the electrode layers 21 and 22.

The thickness of the core has a relation to the thickness of the electrode layers. The core 20 generally has a thickness less than 0.002 inch and each electrode layer should be at least 5 percent of the overall thickness of the composite structure and each electrode layer should preferably be between 10 and 40 percent of the thickness of the composite structure depending on the sensitivity, response time, and resistance required in the element.

The core 20 and electrode layers 21 and 22 are bonded together through out their extent and various methods may be employed to provide the bond between the members. For example, the electrode layers can be applied by coating the core with a solvent solution of the matrix 23 containing the particles 24, and subsequently evaporating the solvent, or the electrode layers can be bonded to the core by use of auxiliary adhesives.

Figure 4:
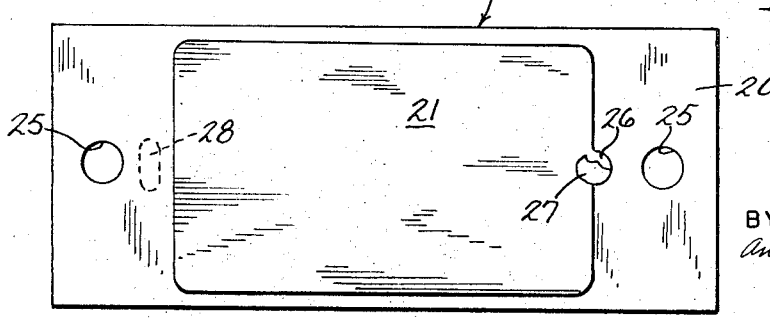
FIG. 4 is a plan view of the humidity sensing element shown in FIGS. 1–3.

As shown in FIGS. 4 and 5 the electrode layer 22 has substantially the same area as the core 20 and is essentially coextensive in length and width with the core. However, the electrode layer 21 has a substantially lesser length and width than the core so that the side edges of the core, as well as the ends of the core project beyond the corresponding ends and side edges of the electrode layer 21. The side edges of the electrode layer 21 are spaced from the side edges of the core 20 so that there is no possibility of the electrically conductive particles of one of the electrode layers bridging the core to short out the element.

The entire surface area of the electrode layer 21 should be exposed to the environment to be sensed and it is not in itself clamped to the frame. As shown in FIG. 4, mounting holes 25 are provided in the core 20 and electrode layer 22 and these holes are spaced a substantial distance from the ends of the electrode layer 21. One end of the electrode layer 21 is provided with a generally semicircular tab or ear 26 and a mound or daub of electrically conductive material, such as silver paint, is applied to the projection 26, as shown in FIGS. 4 and 5. Similarly, a projecting mound 28 of electrically conductive material, such as silver paint or the like, is applied to the exposed surface of the other electrode layer 22. In the assembled position, as shown in FIG. 2, the electrode layer 21 is not in itself clamped between the plates 11, 12 and 13 of the frame, but is substantially completely exposed to the environment to be sensed. More specifically, the clamping of the electrode layer 21 is done against the projection 26 so that the ends of the electrode layer 21 are located above the clamping plates 11 and 12, as shown in FIG. 2.

In the assembled condition, as illustrated in FIG. 2, the daub of silver paint 27 is compressed against the exposed end 29 of a conductor 30 which is embedded within the central plate 13. The opposite end of the conductor 30 extends outwardly of the plate 13 and provides a terminal 31. In a similar manner, the daub of silver paint 28 on the electrode layer 22 is compressed against the exposed end 32 of a conductor 33 that is embedded within the end plate 12, while the opposite end of the conductor 33 terminates in an exposed terminal 34. Thus, the clamping provided by the eyelet or rivet 15 serves to urge the contacts or tabs 27 and 28 firmly against the respective conductors 30 and 33, with the daubs 27 and 28 providing pressure points to insure positive electrical contact. While the above description shows the daubs 27 and 28 being provided on the electrode layers, it is contemplated that the structure could be reversed and the daubs could be applied to the exposed ends of the conductors 30 and 33 with the same results.

To assemble the element 3 with respect to the frame, the central plate 13 is located between the free ends of the element 3 with the end plates 11 and 12 positioned on either side of the element and the tubular member 14 projecting through the aligned holes 25 in the element, as well as through an opening in the central plate 13. The eyelet 15 is then inserted through the tubular member 14, and the end of the eyelet is deformed outwardly to provide the head 19 and clamp the members together. As previously noted, the clamping pressure provided by the eyelet 15, along with the spring washer 17, serves to urge the electrically conducting tabs 27 and 28 against the respective conductors to provide a positive electrical contact.

FIGS. 6–9 illustrate a modified form of the invention, which includes a capacitance humidity sensing element 35 which is arranged in a U-shaped configuration and has its ends secured to a mounting frame 36, similar to frame 4. The element 35 and frame 36 can be secured within an outer casing, similar to casing 2.

As illustrated in FIGS. 7–9, the element 35 comprises a dielectric, moisture sensitive core 37 similar to core 20, and a pair of electrode layers 38 and 39, similar to electrode layers 21 and 22 of the first embodiment, are bonded to opposite surfaces of the core 37. The electrode layers 38 and 39 are formed of a dielectric matrix, fabricated from materials similar to that described with respect to the matrix 23, and a plurality of electrically conductive particles similar to particles 24, previously described, can be dispersed within the matrix. As in the case of the first embodiment, the electrode layer 39 has substantially the same area as the core 37 and is coextensive with the core, while the electrode layer 38 has a lesser area than the core and the side edges and ends of the core 37 project beyond the corresponding side edges and ends of the electrode layer 38.

Due to the fact that the side edges of the electrode layer 38 terminate short of the side edges of the core 37 there is a tendency for the edges of the element to curl if the matrix of the electrode layers 38 and 39 is hydrolyzed. If an element with curled edges is formed into the U-shaped configuration cracking or tearing can occur along the curled edges. To eliminate the side edge curling, a pair of strips 40 are applied to the side edge portions of the electrode layer 39. The strips 40 are preferably formed of a dielectric material of the same composition and thickness as the core 37. In addition to eliminating the side edge curling, the strips 40 permit casting of the element at higher relative humidites without the film releasing from the supporting glass plate.

The width of the strips 40 is not critical and the edge curling condition can be eliminated if the strips 40 have the same width or are of different widths. However, the strips 40 should have a width greater than the distance between the side edge of the electrode layer 38 and the corresponding side edge of the core 37.

As in the case of the first embodiment, a daub 41 of electrically conductive material, such as silver paint, is applied to an end of the electrode layer 38 and clamping is made to this projecting daub during assembly. Similarly, a daub 42 of electrically conductive material is applied to the undersurface of the electrode layer 39 between the strips 40. In addition the core 37 and electrode layer 39 are provided with mounting holes 43 similar to holes 25 of the first embodiment.

The frame 36 is best illustrated in FIG. 6 and includes a pair of end plates 44 and 45, similar to end plates 11 and 12 of the first embodiment, and a central plate 46. The ends of the element 35 are clamped between the central plate 46 and the respective end plates 44 and 45. To clamp the end plates together an eyelet or rivet 47, having an outer electrically insulating coating, extends through the mounting holes 43 in the element as well as through aligned openings in the end plates 44 and 45 and central plate 46. The eyelet 47 is provided with a central hollow shank 48, which can receive the mounting pin 9 on casing 2, and a pair of enlarged heads 49 which bear against the respective end plates 44 and 45.

As shown in FIG. 6, the central plate 46 is provided with a depending foot or projection 50 and an electrically conductive coating 51 of copper or the like is applied to the lower end of the plate 46 as well as to the foot 50. When the unit is assembled the projecting daub 42 on electrode layer 39 will bear against the coating 51, and the foot 50 provides a terminal which can be connected in an electrical circuit.

The end plate 45 is also provided with a depending foot or projection 52 and an electrically conductive coating 53 of copper, or the like, is applied to the lower portion of the plate 45 as well as to the foot 52. The coating 53 includes an upper hoirzontal section 54 located above the opening in the plate 45 and in the assembled condition, the projection daub 41 on electrode layer 38 is adapted to bear against the section 54 of the coating. A narrow coating section 55 connects the section 54 with the portion 56 of the coating on the foot 52. A layer 57 of insulating material covers the electrically conductive coating section 55 and the insulating coating 57 minimizes any possible adverse influence on the capacitance of the element. The conductive path represented by the coating sections 54 and 55 must be narrow or thin, otherwise it would contribute significantly to the capacitance of the element. However, this requirement is not present with respect to the conductive coating 51, for the capacitance is determined by the smaller electrode layer 38 and not by the electrode layer 39.

The unit shown in FIG. 6 is assembled in a manner similar to that previously described with respect to the first embodiment. In the assembled condition, the projecting tabs 41 and 42 bear firmly against the respective electrical coatings 51 and 53 to provide a positive electrical contact for the element.

The rate of response of the element can be increased by hydrolyzing the outer surface of the matrix of the electrode layers 21 and 22, as illustrated in FIG. 10, to provide hydrolyzed outer surface layers 58. If the matrix is formed of a cellulose ester, the outer surface can be hydrolyzed to regenerated cellulose to increase the rate of response. The cellulose ester matrix can be subjected to the influence of either an alkaline or acid medium to hydrolyze substantially all of the acid radicals in the surface layer to thereby obtain the regenerated cellulose film which provides a maximum rate of response. The hydrolyzation can be accomplished by dipping the element into an alkaline or acid bath and maintaining it in the bath for a period of time sufficient to hydrolyze the acid groups on the surface of the matrix. Alkaline materials which can be employed for the hydrolyzation are aqueous or alcholic solutions of alkali metal bases such as sodium hydroxide, potassium hydroxide, lithium hydroxide. Alternately, alcholic solutions of strong organic bases such as tetramethyl guanidine, triethylamine, benzyltrimethyl ammonium hydroxide, can also be used for the hydrolyzation.

Hot alkaline solutions are preferred to increase the reaction rate. The time of contact or immersion in the alkaline solution depends on the materials used, the temperature and strengths of the solution. The most effective reaction conditions were found to be obtained by immersing the element in a 230°F 40 percent sodium hydroxide solution for a period of 1 to 4 minutes depending on the desired layer thickness.

After hydrolyzation, the element is preferably rinsed in water to remove and dilute the alkaline residue.

Solutions of mineral acids such as hydrochloric acid and sulphuric acid can also be used to provide the hydrolyzed surface layer. However, the use of alkaline materials provide a faster hydrolyzation and are preferred.

The hydrolyzation treatment can also be employed to provide an increased rate of response to change in relative humidity for a matrix consisting of other materials, such as for example, a copolymer of vinylene carbonate and vinyl acetate.

FIG. 11 shows a further modified form of the humidity sensing element 35 in which an additional layer of dielectric material 59 has been applied over the electrode layer 38. The dielectric layer 59, which can be formed of a dielectric material similar to that of the core 37, is coextensive with the core and completely encloses the electrode layer 38. The mound 41 of electrically conductive material projects through the dielectric layer 59 so that electrical contact can be made to the electrode layer 38.

The electrode layer 38 is normally the final layer cast in the manufacturing process, as will be hereinafter described, and this layer has a somewhat rough exposed surface and has a tendency to be brittle and may sometimes crack when bent into U-shape. To minimize this possibility of cracking during bending, the more flexible or ductile layer 59 of the dielectric material can be applied over the electrode layer 38 as shown in FIG. 11.

The humidity sensing element can be connected in any AC or bridge circuit, or charge time circuit, which will measure capacitance and convert this to an electrical signal that can then be read on an indicator or be used to actuate a humidity control system. As shown in FIG. 12, the humidity sensing element 3 is connected across the capacitor 60 in the leg of a modified Wien bridge 62 and the output of the bridge is connected through an amplifier 63 to a meter 64 which is calibrated to indicate the relative humidity.

The humidity sensing element of the invention is an approximately pure capacitance element which will normally provide a 0.1 to 2.0 percent capacitance change with 1 percent change in relative humidity at temperatures in the range of 40°F to 200°F. The capacitance change can be varied by variations of the materials, and it is possible to design a unit having a smaller capacitance change than the range indicated above, in which case the smaller change can be amplified to provide the desired electrical signal.

The following examples illustrate the preparation of the humidity sensing element of the invention.

EXAMPLE NO. 1

An element of the type illustrated in FIGS. 7–9 was prepared by initially formulating an electrode layer solution with the following composition:

7.5 grams cellulose acetate butyrate (17% combined bytyryl)
   7.5 grams Graphon (graphitized carbon)
   150.0 grams ethylene dichloride A solvent solution of dielectric material was prepared by mixing the following materials:

5.0 grams cellulose acetate butyrate (26% combined butyryl)
   95.0 grams ethylene dichloride A strip of polyester resin tape with a solvent resistant adhesive coating and having a width of approximately one-half inch was placed on a glass plate 65, as illustrated in FIG. 13, and a film 66 of the dielectric solution was cast onto the plate with an adjustable strike-off bar. After casting, the tape was immediately removed from the glass plate to provide a gap or space 67 in the layer 66 of the dielectric solution. After the solvent was evaporated from the layer 66, which ultimately constituted the strips 40 of element 35, a layer 68 of the electrode solution was cast over layer 66 and over the space 67 in the layer where the tape had been. After the solvent was evaporated from the layer 68, which constituted the electrode layer 39 in the final product, the surface of the layer 68 was sanded with emery polishing paper until the surface was smooth.

A layer 69 of the dielectric solution was then cast over the first electrode layer 68 with an adjustable strike-off bar to form the core 36 of the element. After evaporation of the solvent, a second strip of polyester tape 70 with a silicone adhesive backing and having rectangular holes 71 punched at intervals along the tape was placed over the dielectric core layer 69. As shown in FIG. 13, the holes 71 in the tape 70 define the area of the second cast electrode layer 38 in the final element. The tape was positioned so that the holes 71 were centered over the space 67 in the initial dielectric film 66. A layer 72 of the electrode solution was then cast over the tape 70 and the portion of the electrode solution that flowed into the holes 71 in the tape formed the second electrode layer 38 after evaporation of the solvent. The tape was preferably removed after complete evaporation of the solvent of the second electrode layer.

Following the casting, specimens were then cut from the dry film along the dotted lines indicated in FIG. 13 to provide four film assemblies or elements. The elements were released from the glass plate by running cold water over the films.

The rate of response to changes in relative humidity was increased by hydrolyzing the outer surface of the electrode layers by immersing the elements in an aqueous solution containing 40 percent sodium hydroxide at 230°F for 1 minute. After the hydrolyzing treatment, the elements were rinsed in water and dried.

Silver paint contacts 41 and 42 were applied to the electrode layers of each element and each element was then assembled between the mounting plates of the insulating frame in the manner previously described.

EXAMPLE 2

A humidity sensing element was prepared in the manner described with respect to Example No. 1, except that the dielectric strips 40 were eliminated and the electrode layer solution and the core solution has the following composition.

Electrode layer solution:
      3.33 grams deoxidized Vulcan XC-72 carbon
      10.00 grams cellulose acetate butyrate (17% combined butyryl)
      150.00 grams ethylene dichloride
   Dielectric core solution:
      5.00 grams cellulose acetate butyrate (26% combined butyryl)
      95.00 grams ethylene dichloride

EXAMPLE NO. 3

A humidity sensing element was prepared in accordance with the procedure outlined in Example No. 2, using the following solutions.

Electrode layer solution:
      7.50 grams cellulose acetate butyrate (17% combined butyryl)
      6.00 grams Graphon carbon
      130.00 grams ethylene dichloride
   Crosslinkable dielectric core solution:
      6.20 grams cellulose acetate butyrate (26% combined butyryl)
      1.55 grams urea-formaldehyde monomer
      0.65 grams $n$-butyl alchol
      0.53 grams ethyl alchol
      0.15 grams $p$-toluenesulfonic acid
      1.60 grams triethylamine
      89.32 grams ethylene dichloride After evaporation of the solvent from the film the core layer was crosslinked by heating the film on the glass plate to a temperature of 350°F for 15 minutes.

The capacitance humidity sensing element of the invention can be fabricated by simple manufacturing techniques and can be assembled with the mounting frame with the minimum of labor. Moreover, the mounting frame structure insures a positive electrical connection between the element and the contacts due to the use of the projecting tabs of electrically conductive material that are applied to the electrode layers and clamped between the mounting plates.

Various modes of carrying out the invention are contemplated as being within the scope of the following claims particularly pointing out and distinctly claiming the subject matter which is regarded as the invention.

I claim:

1. A capacitance humidity sensing element, comprising a film-like core formed of a dielectric moisture sensitive material, an electrode layer bonded to each surface of the core and being porous to the diffusion of water vapor therethrough, each electrode layer comprising a dielectric matrix and having a plurality of interconnected electrically conductive particles distributed within said matrix, a first of said electrode layers having an area less than that of the core, whereby opposed portions of the periphery of the core project beyond the periphery of the first electrode layer, said element having a generally U-shape with the opposed portions of the core being located at the free ends of the U-shaped element and the free ends of the element lying in spaced generally parallel planes, and mounting means located at the opposed portions of the core for mounting the element in an insulated frame.

2. The element of claim 1, wherein the core has a generally rectangular shape and said opposed portions are located at the ends of the core.

3. The element of claim 2, wherein the side edges of the core project laterally beyond the corresponding side edges of the first electrode layer.

4. The element of claim 3, wherein the second of said electrode layer is substantially coextensive in area with said core.

5. The element of claim 1, wherein the dielectric matrix of each electrode layer is formed of a hydrolyzable material and the outer surface of said matrix is hydrolyzed to increase its rate of response to changes in relative humidity.

6. The element of claim 1, wherein substantially the entire first electrode layer is exposed and free of attachment to said mounting means.

7. The element of claim 1, wherein the mounting means includes a pair of electrical conductors adapted to be connected in an electrical circuit, clamping means for clamping each electrode layer to one of said conductors, and projecting pressure means disposed between each electrode layer and the coresponding conductor to provide a positive electrical contact therebetween.

8. The element of claim 7, wherein the projecting pressure means comprises a mound of electrically conductive material connected to each electrode layer and extending outwardly beyond the surface of said electrode layer.

9. The element of claim 1, wherein the core is capable of absorbing at least 1 percent, based on its dry weight, of moisture when exposed to 95 percent relative humidity at 70°F for a period of 30 minutes.

10. The element of claim 1, wherein both the core and the matrix have a dielectric constant in the range of 1.1 to 10 and an electrical resistivity above $1 \times 10^9$ ohm inches.

11. The element of claim 1, wherein the core and the matrix are composed of cellulose esters.

12. A capacitance humidity sensing element assembly, comprising an element including a sheet-like core formed of a dielectric moisture sensitive material, said element also including an electrode layer bonded to each surface of the core and being porous to the diffusion of water vapor therethrough, each electrode layer comprising a dielectric matrix having a plurality of interconnected electrically conductive particles distributed within said matrix, a mounting frame connected to spaced portions of the element and including a pair of electrical conductors adapted to be connected in an electrical circuit, and clamping means for connecting each electrode layer to one of said conductors to provide a positive electrical contact therebetween, said element having a generally U-shape and the ends of the element lie in spaced generally parallel planes and are connected to said mounting frame.

13. The assembly of claim 12, wherein a first of said electrode layers has a length less than the length of the core, whereby the ends of the core project beyond the corresponding ends of the first electrode layer, said mounting frame being connected to the projecting ends of said core and substantially the entire surface area of said first electrode layer being exposed to the environment and being free of attachment to said mounting frame.

14. The assembly of claim 13, wherein said first electrode layer has a width less than the width of the core whereby the side edges of the core project laterally beyond the corresponding side edges of the first electrode layer.

15. The assembly of claim 14, including a strip of dielectric material bonded to each side edge of the second electrode layer, said strips being spaced apart.

16. The assembly of claim 12, wherein said mounting frame includes a central member and a pair of end members, one end of the element being clamped between said central member and one of said end members and the opposite end of the element being clamped between the other of said end members and said central member.

17. The assembly of claim 16, wherein each conductor is embedded within a frame member, one end of each conductor being exposed and clamped to the corresponding electrode layer and the opposite end of each conductor being connected to a terminal.

18. The assembly of claim 16, wherein said clamping means comprises a fastener disposed within aligned openings in said central member, said end members and the ends of said element.

19. The assembly of claim 18, wherein the fastener is hollow, said assembly also includes an outer perforated casing disposed around the element and secured to said end members of the frame, and connecting means extending through the hollow interior of said fastener for connecting the casing to the frame.

20. A capacitance synthetic humidity sensing element, comprising an elongated generally rectangular core formed of a dielectric material capable of absorbing at least 1 percent, based on its dry weight, of moisture when exposed to 95 percent relative humidity at 70°F for a period of 30 minutes, an electrode layer bonded to each surface of the core and being porous to the diffusion of water vapor therethrough, each electrode layer comprising a dielectric matrix and having a plurality of interconnected electrically conductive particles distributed within said matrix, a first of said electrode layers having a length less than that of the core whereby the ends of the core project beyond the corresponding ends of the first electrode layer and said first electrode layer having a width less than the width of the core whereby the side edges of the core project laterally beyond the corresponding side edges of the first electrode layer, the second layer being coextensive in width with said core, and a strip of dielectric material bonded to each side edge portion of the second electrode layer, each strip having a width greater than the space between the side edge of the core and the corresponding side edge of the first electrode layer, said strips acting to prevent side edge curling of the element.

21. The element of claim 20, wherein the element has a generally U-shape with the ends of the element lying in substantially parallel planes, and said element includes mounting means disposed at the projecting ends of the core for mounting the element in an insulating frame.

22. The element of claim 20, and including a projection of electrically conductive material connected to each electrode layer and projecting outwardly beyond the surface of the respective electrode layer.

23. The element of claim 22, and including a coating of dielectric material disposed over said first electrode layer, the projection connected to said first electrode layer extending through said coating.

24. A capacitance synthetic humidity sensing element assembly, comprising an element including an elongated sheet-like core formed of a dielectric moisture sensitive material, said element also including an electrode layer bonded to each surface of the core and being porous to the diffusion of water vapor therethrough, each electrode layer comprising a dielectric matrix having a plurality of interconnected electrically conductive particles distributed within said matrix, said first electrode layer having a width less than the width of the core whereby the side edges of the core project laterally beyond the corresponding side edges of the first electrode layer, and a strip of dielectric material bonded to each side edge of the second electrode layer, said strips being spaced apart.

25. The assembly of claim 24, wherein each of said strips has a thickness and expansion coefficient corresponding to the thickness and expansion coefficient of the core.

26. A capacitance synthetic humidity sensing element assembly, comprising an element including a sheet-like core formed of a dielectric moisture sensitive material, said element also including an electrode layer bonded to each surface of the core and being porous to the diffusion of water vapor therethrough, each electrode layer comprising a dielectric matrix having a plurality of interconnected electrically conductive particles distributed within said matrix, a mounting frame connected to spaced portions of the element and includng a pair of electrical conductors adapted to be connected in an electrical circuit, clamping means for connecting each electrode layer to one of said conductors to provide a positive electrical contact therebetween, and an outer insulating casing disposed around the element and connected to the frame, said casing having openings therein whereby the element is exposed to the atmosphere.

27. The assembly of claim 26, and including a terminal connected to each conductor and projecting outwardly of the frame and casing.

* * * * *